(12) United States Patent
Borgström

(10) Patent No.: US 6,599,486 B1
(45) Date of Patent: Jul. 29, 2003

(54) MODULAR OZONE GENERATOR SYSTEM

(75) Inventor: Jan Borgström, Landskrona (SE)

(73) Assignee: Ozonator, Ltd., Jersey (GB)

( * ) Notice: Subject to any disclaimer, the term of this patent is extended or adjusted under 35 U.S.C. 154(b) by 89 days.

(21) Appl. No.: 09/663,806

(22) Filed: Sep. 15, 2000

(51) Int. Cl.$^7$ ................................................ B01J 19/08
(52) U.S. Cl. ............................... 422/186.07; 422/186.2
(58) Field of Search ........................ 422/186.07, 186.2

(56) References Cited

U.S. PATENT DOCUMENTS

| | | | |
|---|---|---|---|
| 3,973,133 | A | 8/1976 | Emigh et al. |
| 4,034,229 | A | 7/1977 | Grossen et al. |
| 4,307,433 | A | 12/1981 | Takeshi et al. |
| 4,545,960 | A | 10/1985 | Erz et al. |
| 4,869,881 | A | 9/1989 | Collins |
| 4,960,570 | A | 10/1990 | Merchtersheimer |
| 5,008,087 | A | 4/1991 | Batchelor et al. |
| 5,211,919 | A | 5/1993 | Conrad |
| 5,354,541 | A | 10/1994 | Sali et al. |
| 5,366,702 | A | 11/1994 | Rimpler ................. 422/186.07 |
| 5,417,936 | A | 5/1995 | Suzuki et al. |
| 5,435,978 | A | 7/1995 | Yokomi |
| 5,516,493 | A | 5/1996 | Bell et al. |
| 5,529,760 | A | 6/1996 | Burris |
| 5,538,695 | A | 7/1996 | Shinjo et al. |
| 5,554,345 | A | 9/1996 | Kitchenman et al. |
| 5,770,168 | A | 6/1998 | Carlsten et al. |
| 5,879,641 | A | 3/1999 | Conrad et al. |
| 5,932,180 | A | 8/1999 | Zhang et al. |
| 5,942,196 | A | 8/1999 | Tabata et al. |
| 5,950,065 | A | 9/1999 | Arlemark |

FOREIGN PATENT DOCUMENTS

| | | |
|---|---|---|
| EP | 0 679 608 A2 | 2/1995 |
| EP | 0 830 312 | 2/1996 |
| HU | 216043 B | 4/1999 |
| JP | 55067510 | 5/1980 |
| JP | 62212201 | 2/1986 |
| JP | 62278105 | 12/1987 |
| JP | 7187609 | 7/1995 |
| JP | 7187610 | 7/1995 |
| JP | 7242403 | 9/1995 |
| JP | 8245203 | 9/1996 |
| JP | 9255308 | 9/1997 |
| JP | 10029806 | 2/1998 |
| JP | 11209105 | 8/1999 |

OTHER PUBLICATIONS

Hirose, Suzuki, Shirtara, Kamase, Yamamoto, Hoshino, Nakashizu; development of Ultra–high Concentration Ozone Generator; Aug. 25, 1999; pp. 177–183; 14$^{th}$ Ozone World Congress, Dearborn Michigan, USA, 1999.

Kuzumoto, Tabata, Yagi; High Density Ozone Generation in a Very narrow Gap by Silent Discharge; pp. 51–58, *no date and publication available.

*Primary Examiner*—Kishor Mayekar
(74) *Attorney, Agent, or Firm*—Boyle Fredrickson Newholm Stein & Gratz S.C.

(57) ABSTRACT

An ozone generator system in which a multitude of plate type ozone generators are arranged adjacent to each other in a block. Each ozone generator comprises a chamber, adapted for converting oxygen to ozone by a corona discharge, and each chamber is provided with an inlet for oxygen or an oxygen-rich gas and an outlet for ozone. The ozone generators are arranged in a block module in which they are affixed by a block rack. The block rack comprises an inlet port adapted for introduction of oxygen gas, and an outlet port adapted for discharge of ozone created through conversion within the generators comprised in the block module. A multitude of first conduits, each running between said inlet port and one chamber inlet, and a multitude of second conduits, each running between said outlet port and one chamber outlet, are provided within said block rack.

25 Claims, 2 Drawing Sheets

MODULAR OZONE GENERATOR SYSTEM

FIELD OF THE INVENTION

The present invention relates to ozone generators adapted for ozone generation by subjecting oxygen to a high-frequency alternating current (AC) of high voltage over a dielectric medium. More precisely, the invention relates to an ozone generator system wherein a multitude of plate type ozone generators are arranged in a block and wherein one or several blocks may be comprised in a modular ozone generator system.

BACKGROUND

Ozone has highly oxidising properties and is used, preferably in diluted form, for sterilisation of water. For example, sewage water can be treated with the aim of decomposing or eliminating environmentally or health hazardous substances therefrom, as well as removing unpleasant odours from the water, and drinking water can be pre-treated with the intention of improving the quality of the water. Other areas of use are e.g. as a bleaching agent in the paper industry, for air cleaning and for performing certain oxidation reactions within organic chemistry.

Ozone is produced by letting oxygen, or a gas rich in oxygen, pass through an electrical discharge. Oxygen or an oxygen-rich gas is thereby allowed to flow through a chamber in an ozone generator, said chamber being defined either by two co-axial tubes, or a series of plates, between which tubes or plates an electrical discharge is taking place. In this description, the terms space and chamber are used as denomination for the same thing, i e. the location inside the ozone generator where existing oxygen or oxygen-rich gas is converted into ozone. The first mentioned type of ozone generator is, for industrial purposes, very large and bulky, and difficult and costly to manufacture and maintain. The second type of ozone generator, here called the plate type, is less demanding in terms of economy and space. As the demand for reliable, large capacity ozone generators tends to increase, plate type ozone generators are often arranged on top of each other in blocks, whereby larger ozone generator systems can be obtained. Some examples of such ozone generator systems are disclosed in WO 97/01507 by Arlemark, and in U.S. Pat. No. 5,435,978 by Yokomi.

One problem associated with ozone generators is connected with the chamber, in which oxygen in the form of oxygen gas or a gas rich in oxygen is converted into ozone, having at least one delimiting surface made of a dielectric material, a so called dielectric. This dielectric is used for the purpose of generating a corona during the discharge between a high-voltage electrode and ground, and normally consists of a ceramic or glass material. Pressure variations in the gas fed into the chamber, for example caused by pressure shocks in the system when the gas supply is switched on or off, will generate high strains in the ceramic material, entailing a risk of cracking it. This problem naturally also tends to increase if, with the aim of increasing the capacity, an increased pressure of the introduced oxygen gas is used. If, furthermore, there is an imbalance in pressure and/or flow between different generators, and between the inlet and outlet ports of the individual generators, the stress upon the total system will be even higher. In ozone generator systems arranged in blocks, it is a further problem if the entire system has to be closed down if one generator breaks down.

Another problem is associated with the very reactive properties of the ozone entailing a tendency for hoses and rubber seals to deteriorate and cause leakage. This applies for example to the seals and gas lines required in connection with the oxygen inlets and the ozone outlets. In ozone generator systems having several generators in a block, this problem will become especially obvious, as at least one inlet and one outlet is required for each generator.

Another problem connected to large ozone generator systems is that they have to be arranged at the location where the ozone is to be used, due to the short life span of the ozone before it disintegrates. As a consequence of the ancillary equipment, such as the connections required for oxygen, ozone and cooling water, having to be constructed on site, the cost of installation tends to become very high.

OBJECT OF THE INVENTION

A general object of the present invention is to provide an ozone generator that eliminates the problems of the known art.

An aspect of this object, using an arrangement of an ozone generator system in which generators are arranged in blocks, is to increase the productivity and improve the efficiency compared to known ozone generator systems, and, beyond that, prevent parts of the device from being damaged or to degenerate due to vibrations and shocks encountered during operation, caused by pressure shocks and excessive pressure in the introduced gas, the electrical discharges in the generator chambers, or uneven gas or coolant flows.

Another aspect of this object is to provide a design of a block type ozone generator system adapted for easy maintenance, and arranged so as to be minimally sensitive to the reactive effect of the ozone.

A further aspect of this object is to provide an ozone generator system designed in such a way that existing moisture in the introduced gas is expelled from the system during operation.

Still another aspect of this object is to provide a design allowing easy de-aeration of the system coolant.

Still another aspect of this object is to provide a design eliminating differences in pressure and flow within the ozone generator system.

Still another aspect of this object is to provide a design allowing easy checking of seals in the gas system.

SUMMARY OF THE INVENTION

Consequently, the present invention relates to an ozone generator system in which a multitude of plate type ozone generators is arranged adjacent to each other in a block. Each ozone generator comprises a high-voltage electrode, a ground electrode and a dielectric, and a chamber, located between said electrodes, for converting oxygen to ozone by a corona discharge between said electrodes over said dielectric. Further, each chamber is provided with an inlet for oxygen or an oxygen rich gas and an outlet for ozone. Said ozone generators are arranged in a block rack adapted for fixing the ozone generators into said block, said block and block rack defining a block module. The invention is characterised by said block rack comprising an inlet port adapted for the introduction of oxygen and an outlet port adapted for the discharging of ozone created through conversion in the generators comprised in the block module. A multitude of first conduits, each running between said inlet port and one chamber inlet, and a multitude of second conduits, each running between said outlet port and one chamber outlet, are provided within said block rack.

By providing conduits within the block rack, running to and from all generator chambers in the block module, no hoses will be needed, and the number of seals required will be reduced, as conduit junctions can be arranged entirely without joints. Through providing said conduits in such a manner that the distance between the block rack inlet and outlet will have the same length, regardless of which generator the introduced gas passes through inside the module, an even gas flow and an even gas pressure is achieved through parallel connection, securing an increased reliability of operation and allowing operation with an increased gas pressure.

BRIEF DESCRIPTION OF THE DRAWINGS

The invention will be described in further detail below, with reference to the drawing figures illustrating a preferred embodiment of the invention.

DETAILED DESCRIPTION OF PREFERRED EMBODIMENTS

Figure 1:
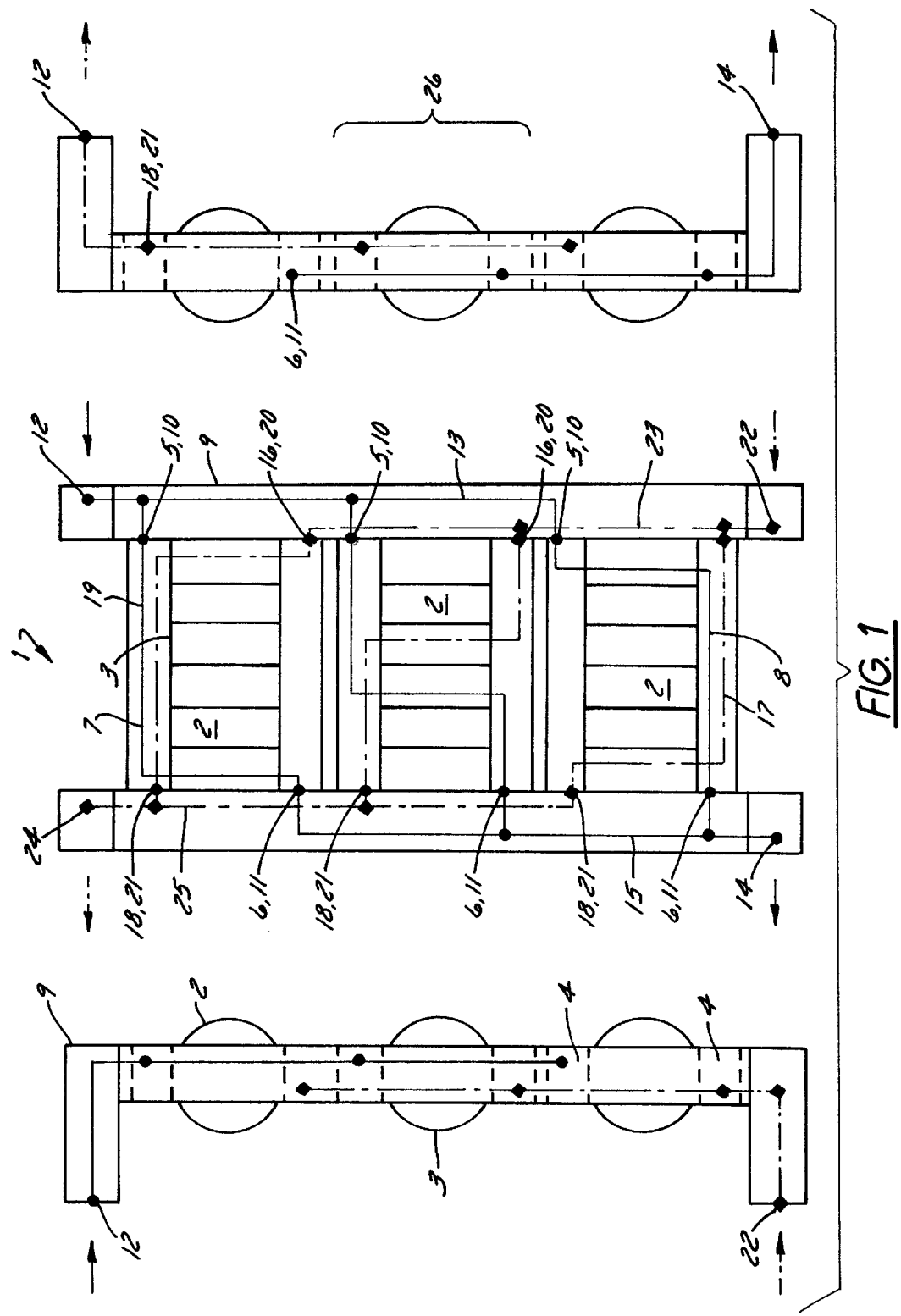
FIG. 1 illustrates a preferred embodiment of an ozone generator system.

FIG. 1 shows an ozone generator system 1 according to the present invention, comprising a multitude of plate type ozone generators 2 arranged adjacent to each other in blocks 3. Even if only some of the generators and the blocks in the figure are provided with reference numbers, with the aim of making the figure as clear as possible it is clearly shown in the figure that the illustrated embodiment of the invention comprises three blocks 3, each comprising six generators 2. Likewise, it should be understood that the person skilled in the art could easily modify the proposed embodiment into containing an arbitrary number of blocks comprising an arbitrary number of generators. Thus, the illustrated preferred embodiment is solely to be regarded as an example.

Each ozone generator 2 comprises, in a not shown but well known manner, a high-voltage electrode, a ground electrode and a dielectric and, a chamber, located between said electrodes, for converting oxygen into ozone by a corona discharge between said electrodes over said dielectric. Further, each chamber is provided with at least one inlet for oxygen or an oxygen-rich gas and at least one outlet for ozone. There are several different designs of plate type generators available in the market, and the specific design of the individual generator is not essential to the invention. However, it is to be understood that all generators 2 within the system 1 are of the same type and size. The illustrated generators are circular, but it should be understood that an arbitrary shape could be applied to the invention, e.g. oval, triangular, square, rectangular, pentagonal, etc.

Said ozone generators 2 are arranged in a block rack 4 for each block 3. In the simplified and exemplifying figure, each block rack 4 comprises two crossbars. It will be understood that numerous different manners of arranging the block rack are conceivable, and that the illustrated example is not to be understood as limiting, but illustrative only. In the figure, only the lower block rack is provided with a reference denomination, in order to enhance the clarity of the figure. In a not shown manner, the block racks 4 mechanically affix the generators 2 into a block 3. Together, the block 3 and the block rack 4 define a block module 26. Characterising for the invention is, that said block rack 4 comprises an inlet port 5, adapted for introducing the oxygen gas, and an outlet port, adapted for discharging the ozone, created through conversion in the generators 2 comprised in the block module 26. A multitude of first conduits 7, running between said inlet port 5 and each one chamber inlet, and a multitude of second conduits 8, running between said outlet port 6 and each one chamber outlet, are provided within said block rack 4. With the aim of simplifying the figure, only the conduits 7 to, and 8 from, one generator 2 are shown, but it will be understood that corresponding conduits will exist within the block rack 4 for all generators 2 of the block module 26, extending in parallel between the inlet port 5, the generator, and the outlet port 6, respectively.

The block rack 4 thus serves both as a mechanically retaining element for the block 3, and as an inlet and outlet device for the generators 2 comprised in the block module 26. By providing conduits running to and from all generator chambers within the block rack 4, no hoses will be needed, and the number of seals required can be reduced, as junctions within the conduits 7, 8 can be arranged entirely without joints.

Furthermore, only one connection 5 for the introduction of oxygen to the generators 2 comprised in the block module 26 is needed, and only one connection for the ozone discharge therefrom, which will reduce the number of seals as well as warrant a reduced installation cost and an increased reliability of operation.

Furthermore, both maintenance and troubleshooting are simplified, as an entire block module 26 can be replaced and be pressure tested for the detection of any leaks. In a preferred embodiment, the conduits 7 and 8 at each generator connection further provided with a pressure sensor, thereby further simplifying troubleshooting as, by a pressure test, one can immediately gather which one, if any, of the generators 2, that is leaking.

The total distance, from the inlet port 5 to the outlet port 6, via the generator and the conduits 7 and 8, has the same length for each generator within a block module 26. Thus, all generators 2 comprised in the block module 26 are connected in parallel, having an equally long distance of flow between the inlet port 5 and the outlet port 6, regardless of which generator 2 the introduced gas will pass through. Therefore, any pressure drops or pressure shocks within the gas supplied to the block rack 4, preferably oxygen gas or an oxygen-rich gas, or any irregularities in the gas flow, will tend to be levelled out and become equal in all chambers of the generators 2 comprised in the block module 26. This will result in the load on the different generators 2 comprised in the system tending to be equal, no individual generator 2 thus running the risk of being subjected to highly excessive stress. This will warrant an enhanced service life compared to state of the art ozone generator systems.

Preferably, said block module 26 can be placed in a module rack 9, adapted for supporting a multitude of such block modules 26, the block modules 26 preferably being removable from the module rack 9 by means of a simple operation. From the drawing figure it is observable how three block modules 26 are supported in a lying-down arrangement by the module rack 9. The module rack 9, together with the included block modules 26, form a module system, corresponding to the ozone generator system 1 illustrated in the drawing figure. For each block module 26, said module rack 9 comprises a supply connection 10, adapted for the supply of oxygen to said inlet port 5, and a discharge connection 11, adapted for the discharge of ozone from said outlet port 6. In the drawing figure, which is not shown in detail, the inlet port 5 and the supply connection 10 are symbolically illustrated as one unit,but a person skilled in the art will understand that the illustrated connection comprises both these elements. The same of course applies for elements 6 and 11. According to the invention, said module rack 9 has only one collective inlet port 12, from which third conduits 13 are provided within the module rack 9 up to each supply connection 10, and only one collective outlet port 14, from which fourth conduits 15 are provided within the module rack 9 up to each discharge connection 11.

By providing said third 13 and fourth 15 conduits, to and from all block modules 26 arranged in the module rack 9 of the system 1, no hoses will be needed, and the number of seals required can be reduced, as junctions within the conduits 13, 15 can be arranged entirely without joints. Further more, only one connection 12 for the introduction of oxygen to the block modules 26 comprised in the system 1 is needed, and only one connection 14 for the ozone discharge therefrom, which will reduce the number of seals as well as warrant a reduced installation cost.

Preferably, said block modules 26 are designed to be placed at correspondingly adapted locations in the module rack 9, as illustrated in the figure, whereby the inlet ports 5 of the block racks 4 comprised in the block modules 26 will be connected in an airtight manner to their respective supply connections 10, and the outlet ports 6 will likewise be connected in an airtight manner to their respective discharge connections 11. As a result of this arrangement, a block module 26 can easily be removed from the module rack 9, whereby the connections 10 and 11 will preferably be equipped with valves in order to close off the possibility of gas flow communication therethrough. This will improve the maintenance and repair possibilities, as one block module will be quickly exchangeable for a new one. Furthermore, the number of block modules 26 within the module system 1 can be easily decreased or increased according to the required ozone production.

Like in the block rack 4, the conduits 13 and 15 in the module rack 9 are arranged in parallel, in such a way that the distance from the collective inlet port 12 to the collective outlet port 14 will be the same, regardless of which block module 26 the introduced gas will pass through. The advantages thereof are reflected in what has been stated above for the individual block module 26.

In a preferred embodiment, each block module 26 comprises a block rack 4 supporting a lying-down block 3 comprising a multitude of ozone generators 2, and the module rack 9 is, according to the illustrated embodiment, arranged for supporting a multitude of block modules 26, located one above the other. This creates a module system 1 as illustrated in the figure. A person skilled in the art will however understand that an arrangement with standing blocks 3 could just as well be selected, and that the orientation is not of any crucial importance for the invention.

In a preferred embodiment of the ozone generator system according to the invention, the generators 2 comprised in the block module 26 include coolant ducts provided in the respective ground electrode, whereby a coolant inlet port 16 is provided on said block rack 4, and a multitude of first coolant inlet ducts 17, extending from said coolant inlet port 16 to the coolant ducts of each one generator 2 are defined within said block rack 4, and whereby a coolant outlet port 18 is provided on said block rack 4, and a multitude of first coolant outlet ducts 19, extending from the coolant ducts of each one generator to said coolant outlet port 18 are defined within said block rack 4. Through this arrangement, which, in accordance with what has been discussed regarding the gas conduits, applies to all generators and provides an equally long flow distance for the coolant, from the coolant inlet port 16 to the coolant outlet port 18, regardless of which generator is passed, a parallel connection is achieved that provides an even pressure and flow in the coolant system of the entire block module 26.

Further, said module rack 9 for each block module 26 comprises a first coolant connection 20 for the inflow of coolant to said coolant ducts via said coolant inlet port 16, and a second coolant connection 21 for the outflow of coolant from said coolant ducts via said coolant outlet port 18. For the sake of clarity, all coolant ducts are illustrated as dot-dashed lines and rhomb-shaped connections and junctions, while gas conduits are illustrated as continuous lines and ring-shaped connections and junctions. As described earlier, the block modules are easily removable from the module rack 9, whereby the connections 20 and 21 will preferably be equipped with valves in order to close off the possibility of coolant flow communication therethrough. This will improve the maintenance and repair possibilities, as one block module 26 will be quickly exchangeable for a new one. Furthermore, the number of block modules 26 within the module system 1 can be easily decreased or increased according to the required ozone production. According to the invention, said module rack 9 has only one collective coolant inlet port 22, from which second inlet ducts 23 are provided up to each first coolant connection 20, and only one collective coolant outlet port 24 to which second coolant outlet conduits 25 are provided from each second coolant connection 21. Similarly to what has been described for the gas conduits in the module rack 9, the proposed design will result in an equally long distance of flow between the collective coolant inlet port 22 and the collective coolant outlet port 24, regardless of which block module 26 the coolant will pass through. This will warrant an even pressure and flow in the coolant system of the module rack 9.

By the arrangement shown in the drawing figure, where the collective coolant outlet 24 is arranged at the top of the module rack 9, according to a preferred embodiment of the invention, a suitable bleeding valve for the purpose of removing, air from the coolant system is provided at the coolant outlet 24.

The present invention will substantially reduce the installation cost for ozone generator systems comprising a multitude of generators 2. By arranging the generators 2 into blocks 3, retained by block racks 4 into block modules 26, and arranging the block modules 26 into module racks 9 in case several block modules are required, the ozone generator system 1 can be easily enlarged in a modular manner. In spite of this, the module system 1 will have only four external connections, 12, 14, 22, 24. Of these, the connection 12 is of course adapted for connection to a gas source, preferably oxygen gas or an oxygen-rich gas, whereas the connection 14 is adapted for connection to a suitable ozone line. A cooling water source can be connected to the connection 22 and a cooling water dump or a return line to said cooling water source to the connection 24. By the proposed arrangement, time and cost are therefore saved when installing the ozone generator system 1, at the same as the modular design allows an unprecedented possibility for easy maintenance and trouble-shooting. The arrangement with conduits and junctions arranged in block racks and module racks furthermore reduces the number of required seals and hoses warranting increased service reliability. The arrangement provided by the invention allows the ozone generator system to work as a pressure reservoir, as there will be substantially the same pressure in all parts of the gas system. Through avoiding excessive pressures in parts of the system, for example due to pressure shocks or design-induced pressure losses, a higher inlet pressure can be utilised, thus also improving the conversion factor.

With an appropriate design of the module system 1 it is of course also possible to combine several module systems into a group, while still achieving only one inlet port and one outlet port for oxygen/ozone and coolant, respectively. This could for example be arranged by a separate ozone conduit from one side of the module rack 9 to the other, for connection of a collective gas discharge outlet belonging to one module rack 9 to a collective gas discharge outlet belonging to another module rack 9. In this manner a modular system group can be obtained, comprising several module systems 1. The modular design disclosed by the invention can of course be continued into an unending number of levels, and will make it very easy for an ozone supplier to customise, in size, an ozone generator system for a customer whilst still achieving a simple installation with a minimum of external connections.

Figure 2:
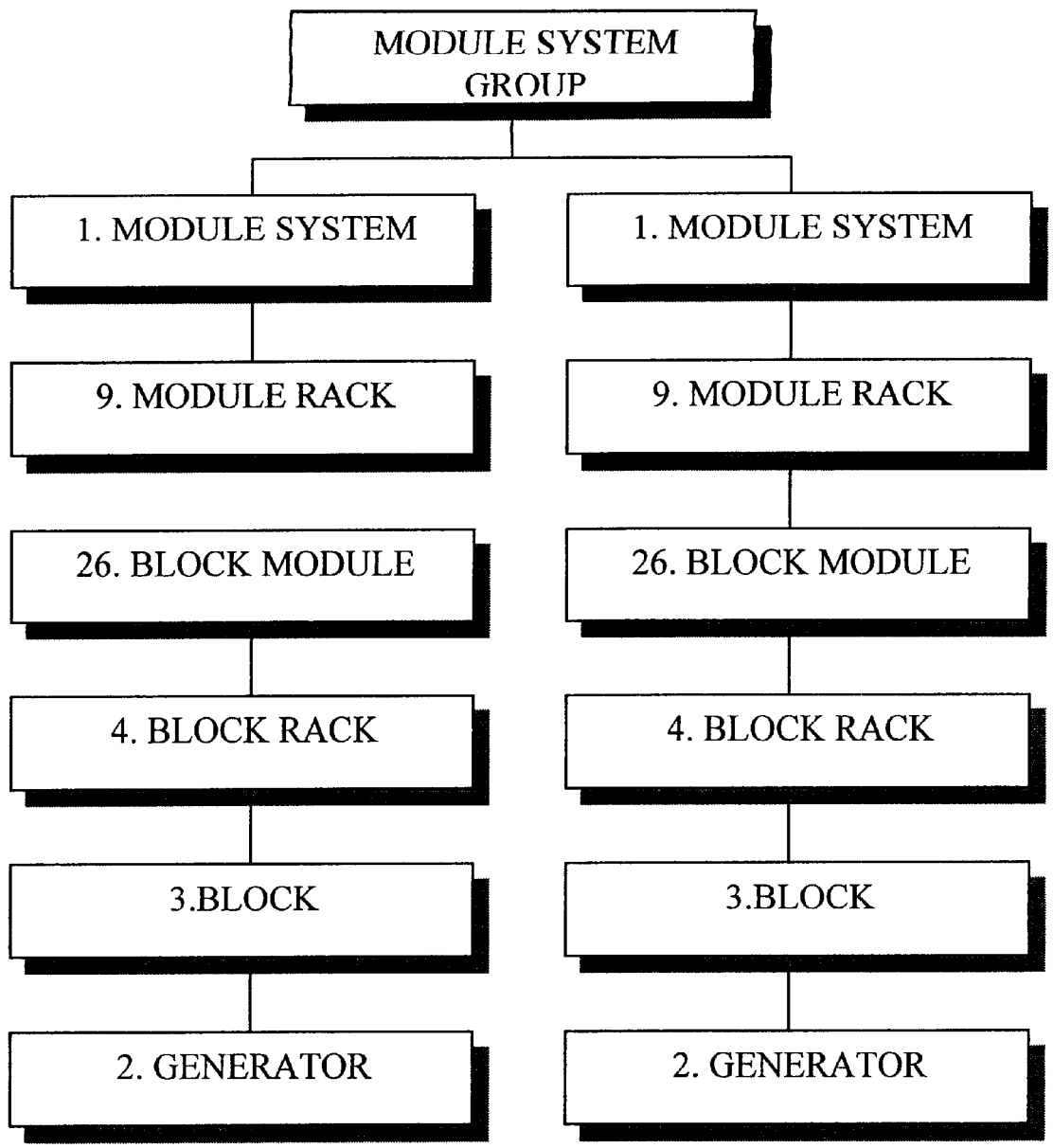
FIG. 2 is a hierarchical illustration of the system of FIG. 1.

Purely hierarchically, and as shown in FIG. 2, the ozone generator system according to the invention can be described as follows:

1) A generator 2, comprising a gas chamber and a coolant duct;
2) A block 3, comprising a multitude of generators 2, placed adjacent to each other;
3) A block rack 4, comprising means for mechanical fixation of a block 3, and connection means for parallel supply and discharge of gas and coolant to each generator 2 of a block 3;
4) A block module 26, comprising a block rack 4 and a block 3 arranged therein,
5) A module rack 9, comprising means for mechanical fixation of block modules 26, and connection means for parallel supply and discharge of gas and coolant to each block module 26;
6) A module system 1, comprising a module, rack 9 and a number of block modules 26 arranged therein;
7) A module system group, comprising several connected module systems 1, said module system group exhibiting only one inlet and one outlet port for gas, and one inlet and one outlet port for coolant, respectively, for the generators 2 comprised therein.

A supplier can thus offer an ozone generation arrangement comprising only one generator 2, a block module comprising several generators 2 arranged in parallel, a module system 1 comprising several block modules 26 arranged in parallel; or a module system group comprising several module systems 1, and yet provide a system that on the one hand allows an even pressure and flow both in the gas and the coolant system, and on the other hand has only one external connection of each type; i.e. an inlet and an outlet, for gas and coolant, respectively.

Preferred embodiments of the invention have been described in detail, but it is still obvious that variations are conceivable, within the scope defined by the appended claims.

What is claimed is:

1. An ozone generator system in which a multitude of plate ozone generators are arranged adjacent to each other in a block, the plate ozone generators each comprising a high-voltage electrode, a ground electrode and a dielectric, and a chamber, located between said electrodes, for converting oxygen to ozone by a corona discharge between said electrodes over said dielectric, the chamber being provided with an inlet for oxygen or an oxygen-rich gas and an outlet for ozone, said ozone generators being arranged in a block module comprising a block rack adapted for fixing the ozone generators into said block, said block rack comprising one inlet port adapted for the introduction of oxygen, and, provided within said block rack, a plurality of first conduits running between said inlet port and a number of chamber inlets, and one outlet port adapted for the discharge of ozone, and, provided within said block rack, a plurality of second conduits running between said outlet port and a number of chamber outlets, wherein a flow path is formed in each of said generators between the inlet port and the outlet port, and wherein the flow path length of the flow paths of each and every one of the generators comprised in the block module is substantially the same.

2. The ozone generator system according to claim 1, wherein said block module can be placed in a module rack, adapted for supporting a multitude of such block modules in an arrangement where the block modules are removable by means of a simple operation, said module rack comprising, for each of the block modules, a supply connection, adapted for the supply of oxygen to said inlet port, and a discharge connection, adapted for the discharge of ozone from said outlet port, said module rack having a collective inlet port, from which third conduits are provided within said module rack up to each of the supply connections, and a collective outlet port, from which fourth conduits are provided within said module rack up to each of the discharge connections.

3. The ozone generator system according to claim 2, wherein the flow distance between said collective inlet port and said collective outlet port has the same length through each and any one of the block modules comprised in the module rack.

4. The ozone generator system according to claim 3, wherein the block module comprises the block rack supporting a lying-down block comprising the multitude of ozone generators, and wherein said module rack is arranged for supporting a multitude of block modules, located one above the other.

5. The ozone generator system according to claim 4, wherein, for the block rack said supply and discharge connections are equipped with shut-off valves, the block module thereby being removable from said module rack without any influence on the other block modules comprised in the block rack.

6. The ozone generator system according to claim 4, wherein gas connections in the block module between a port connectable to an oxygen source and a port connectable to an ozone reservoir, are formed without hoses.

7. The ozone generator system according to claim 1, wherein the generators comprised include coolant ducts provided in the respective ground electrode, wherein a coolant inlet port is provided on said block rack, and a multitude of first coolant inlet ducts extending from said coolant inlet port to the coolant ducts of one generator each, are defined within said block rack, and wherein a coolant outlet port is provided on said block rack and a multitude of first coolant outlet ducts extending from the coolant ducts of one generator each to said coolant outlet port, are defined within said block rack.

8. The ozone generator system according to claim 7, wherein the flow distance between said coolant inlet port and said coolant outlet port has the same length through each and any one of the generators comprised in the block module.

9. The ozone generator system according to claim 8, wherein said block module can be placed in a module rack, adapted for supporting a multitude of such block modules in an arrangement where the block modules are removable by means of a simple operation, said module rack comprising, for each of the block modules, a first coolant connection adapted for the supply of coolant to said coolant inlet port, and a second coolant connection adapted for the discharge of coolant from said coolant outlet port, said module rack having a collective coolant inlet, from which second inlet ducts are provided, within said module rack, up to each of the first coolant connections, and a collective coolant outlet, from which second coolant outlet conduits are provided, within said module rack, to each of the second coolant connections.

10. The ozone generator system according, to claim 9, wherein the flow distance between said collective coolant inlet and said collective coolant outlet has the same length through each and any one of the block modules comprised in the module rack.

11. The ozone generator system according to claim 10, wherein a bleeding valve is provided in connection with said collective coolant outlet, adapted for de-aeration of the coolant within the ozone generator system.

12. The ozone generator system according to claim 1, wherein said block module can be placed in a module rack, adapted for supporting a multitude of such block modules in an arrangement where the block modules are removable by means of a simple operation, said module rack comprising, for each of the block modules, a supply connection, adapted for the supply of oxygen to said inlet port, and a discharge connection, adapted for the discharge of ozone from said outlet port, said module rack having a collective inlet port, from which third conduits are provided within said module rack up to each of the supply connections, and a collective outlet port, from which fourth conduits are provided within said module rack up to each of the discharge connections.

13. The ozone generator system according to claim 12, wherein the flow distance between said collective inlet port and said collective outlet port has the same length through each and any one of the block modules comprised in the module rack.

14. The ozone generator system according to claim 13, wherein the block module comprises the block rack supporting a lying-down block comprising the multitude of ozone generators, and wherein said module rack is arranged for supporting a multitude of block modules, located one above the other.

15. The ozone generator system according to claim 14, wherein, for the block rack said supply and discharge connections are equipped with shut-off valves, the block module thereby being removable from said module rack without any influence on the other block modules comprised in the block rack.

16. The ozone generator system according to claim 14, wherein gas connections in the block module between a port connectable to an oxygen source and a port connectable to an ozone reservoir, are formed without hoses.

17. An ozone generator system comprising:
a first plurality of adjacent ozone generators arranged in parallel with each one of the ozone generators of the first plurality of ozone generators having (a) an oxygen inlet, an ozone discharge outlet, and an ozone flow path leading from the oxygen inlet through one of the ozone generators of the first plurality of adjacent ozone generators to the ozone discharge outlet, and (b) a coolant inlet, a coolant outlet, and a coolant flow path leading from the coolant inlet to the coolant outlet;
a second plurality of adjacent ozone generators arranged in parallel with each one of the ozone generators of the second plurality of ozone generators having (a) an oxygen inlet, an ozone discharge outlet, and an ozone flow path leading from the oxygen inlet through one of the ozone generators of the second plurality of adjacent ozone generators to the ozone discharge outlet, and (b) a coolant inlet, a coolant outlet, and a coolant flow path leading from the coolant inlet to the coolant outlet;
a module rack carrying the first and second plurality of adjacent ozone generators with the first plurality of adjacent ozone generators arranged as a first module that is removable from the module rack and the second plurality of adjacent ozone generators arranged as a second module that is removable from the module rack; and
wherein the ozone flow paths of all of the ozone generators have substantially the same flow path length and the coolant flow paths of all of the ozone generators have substantially the same flow path length.

18. An ozone generator system according to claim 17 wherein each one of the ozone flow paths is defined by a conduit having at least one junction that is arranged without any joint.

19. An ozone generator system according to claim 17 wherein the rack has an oxygen inlet arranged to communicate oxygen to each one of the oxygen inlets of each one of the ozone generators and an ozone outlet arranged to receive ozone from each one of the ozone outlets of each one of the ozone generators.

20. An ozone generator system comprising:
a first plurality of adjacent ozone generators arranged in parallel with one another with each one of the ozone generators of the first plurality of ozone generators having (a) an oxygen inlet, an ozone discharge outlet, and an ozone flow path leading from the oxygen inlet through one of the ozone generators of the first plurality of adjacent ozone generators to the ozone discharge outlet, and (b) a coolant inlet, a coolant outlet, and a coolant flow path leading from the coolant inlet to the coolant outlet;
a second plurality of adjacent ozone generators arranged in parallel with one another with each one of the ozone generators of the second plurality of ozone generators having (a) an oxygen inlet, an ozone discharge outlet, and an ozone flow path leading from the oxygen inlet through one of the ozone generators of the second plurality of adjacent ozone generators to the ozone discharge outlet, and (b) a coolant inlet, a coolant outlet, and a coolant flow path leading from the coolant inlet to the coolant outlet;
a rack carrying the first and second plurality of adjacent ozone generators with the first plurality of adjacent ozone generators arranged as a first module that is removable from the rack and the second plurality of adjacent ozone generators arranged as a second module that is removable from the rack with ozone generators of the second plurality of ozone generators being in line with ozone generators of the first plurality ozone generators, wherein the,rack has an oxygen inlet providing oxygen to each oxygen inlet of each ozone generator, and the rack has an ozone discharge that receives ozone generated by each ozone generator from the ozone outlet of each ozone generator and permits discharge of the ozone; and
wherein the ozone flow paths of all of the ozone generators in the first module have the same flow path length and the ozone flow paths of all of the ozone generators in the second module have the same flow path length.

21. An ozone generator system comprising:
- a first plurality of ozone generators arranged side-by-side in parallel in a first module of generally rectangular cross section with each ozone generator having an ozone flow path;
- a second plurality of ozone generators arranged side-by-side in parallel in a second module of generally rectangular cross section with each generator having an ozone flow path;
- a rack that removably receives and retains the first and second modules and arranges them along a common plane;
- wherein the flow path length of each one of the ozone flow paths of each one of the ozone generators is substantially the same.

22. An ozone generator system according to claim 21 wherein the rack has a plurality of generally longitudinally extending conduits that are each disposed along one side of each one of the modules and a plurality of pairs of transversely extending ducts with each one of the ducts disposed along another side of one of the modules with each one of the conduits and the ducts arranged to permit flow of gas and coolant therethrough.

23. An ozone generator system according to claim 21 wherein each module is comprised of a plurality of pairs of ozone generators and the rack is constructed and arranged to receive and retain a plurality of pairs of modules.

24. An ozone generator system comprising:
- a first plurality of ozone generators arranged side-by-side in parallel in a first module of generally rectangular cross section with each ozone generator having an oxygen inlet and an ozone outlet;
- a second plurality of ozone generators arranged side-by-side in parallel in a second module of generally rectangular cross section with each generator with ozone generator having an oxygen inlet and ozone outlet;
- a rack comprised of a plurality of spaced apart longitudinally extending and parallel supports with integral conduits and a plurality of pairs of parallel supports with integral ducts that each extends transversely relative to the conduits from one of the conduits to another one of the conduits with the rack having an oxygen intake that communicates oxygen to the oxygen inlet of each one of the ozone generators and an ozone discharge arranged to receive ozone generated by each one of the ozone generators wherein a plurality of flow paths are defined between the oxygen intake and the ozone discharge and through each ozone generator that have substantially the same flow path length.

25. An ozone generator system comprising:
- a first plurality of adjacent ozone generators arranged in parallel with one another with each one of the ozone generators of the first plurality of ozone generators having (a) an oxygen inlet, an ozone discharge outlet, and an ozone flow path leading from the oxygen inlet through one of the ozone generators of the first plurality of adjacent ozone generators to the ozone discharge outlet, and (b) a coolant inlet, a coolant outlet, and a coolant flow path leading from the coolant inlet to the coolant outlet;
- a second plurality of adjacent ozone generators arranged in parallel with one another with each one of the ozone generators of the second plurality of ozone generators having (a) an oxygen inlet, an ozone discharge outlet, and an ozone flow path leading from the oxygen inlet through one of the ozone generators of the second plurality of adjacent ozone generators to the ozone discharge outlet, and (b) a coolant inlet, a coolant outlet, and a coolant flow path leading from the coolant inlet to the coolant outlet;
- a ladder-shaped rack carrying the first and second plurality of adjacent ozone generators with the first plurality of adjacent ozone generators with the rack having an oxygen inlet that enables oxygen to be provided to each oxygen inlet of each ozone generator, an ozone discharge that enables ozone outputted from each ozone generator to be discharged from the rack, a coolant intake that enables coolant to be provided to the coolant inlet of each ozone generator and a coolant discharge that enables coolant from all of the ozone generators to be discharged from the rack; and
- wherein each one of the ozone flow paths defined from the oxygen inlet of the rack through each one of the ozone generators to the ozone discharge of the rack has substantially the same flow path length, and each one of the coolant flow paths defined from the coolant intake of the rack through each one of the ozone generators to the coolant discharge of the rack has substantially the same flow path length.

* * * * *